United States Patent

Shiono et al.

[11] Patent Number: 6,163,404
[45] Date of Patent: Dec. 19, 2000

[54] OPTICAL ISOLATOR AND OPTICAL PART HAVING HEAT-RESISTANT ANTI-REFLECTION COATING

[75] Inventors: Yoshiyuki Shiono; Toshiaki Watanabe; Masayuki Tanno; Toshihiko Ryuo, all of Gunma-ken, Japan

[73] Assignee: Shin-Etsu Chemical Co., Ltd., Tokyo, Japan

[21] Appl. No.: 09/193,128

[22] Filed: Nov. 17, 1998

Related U.S. Application Data

[62] Division of application No. 08/768,292, Dec. 17, 1996, Pat. No. 5,872,652.

[30] Foreign Application Priority Data

Dec. 18, 1995 [JP] Japan .................................. 7-328494
Jan. 9, 1996 [JP] Japan .................................. 8-1566

[51] Int. Cl.[7] .................................................. G02B 1/10
[52] U.S. Cl. ........................................ 359/582; 359/581
[58] Field of Search ................................ 359/580, 582

[56] References Cited

U.S. PATENT DOCUMENTS

| | | | |
|---|---|---|---|
| 4,509,880 | 4/1985 | Wamstad | 403/179 |
| 5,128,956 | 7/1992 | Aoki et al. | 372/43 |
| 5,341,235 | 8/1994 | Watanabe et al. | 359/281 |
| 5,566,264 | 10/1996 | Kuke et al. | 385/49 |
| 5,719,705 | 2/1998 | Machol | 359/582 |
| 5,784,201 | 7/1998 | Lee et al. | 359/582 |

*Primary Examiner*—Darren Schuberg
*Attorney, Agent, or Firm*—Wenderoth, Lind & Ponack, L.L.P.

[57] ABSTRACT

An improvement is proposed relating to an optical isolator for bonding of the polarizer and analyzer of polarizing glass to the respective holder rings for position adjustment. The improvement comprises: (a) forming a metallized layer of a specific composition over at least two of the side surfaces of each of the polarizer and analyzer on the area of the surface excepting for the linear areas of 50 to 150 μm width from the top and bottom surfaces of the polarizer or analyzer; and (b) bonding the polarizer and analyzer to the respective holder rings by soldering using a solder alloy with intervention of the metallized layer between the polarizer or analyzer and the holder ring. The invention further provides an optical part having, on at least one of the surfaces, a heat-resistant anti-reflection coating film which is a double-layered film consisting of a thin film of the titanium oxide $TiO_x$ (x=1.9 to 2.2) as the underlayer of high refractive index and a thin film of silicon dioxide as the overlayer of low refractive index.

1 Claim, 6 Drawing Sheets

FIG. I
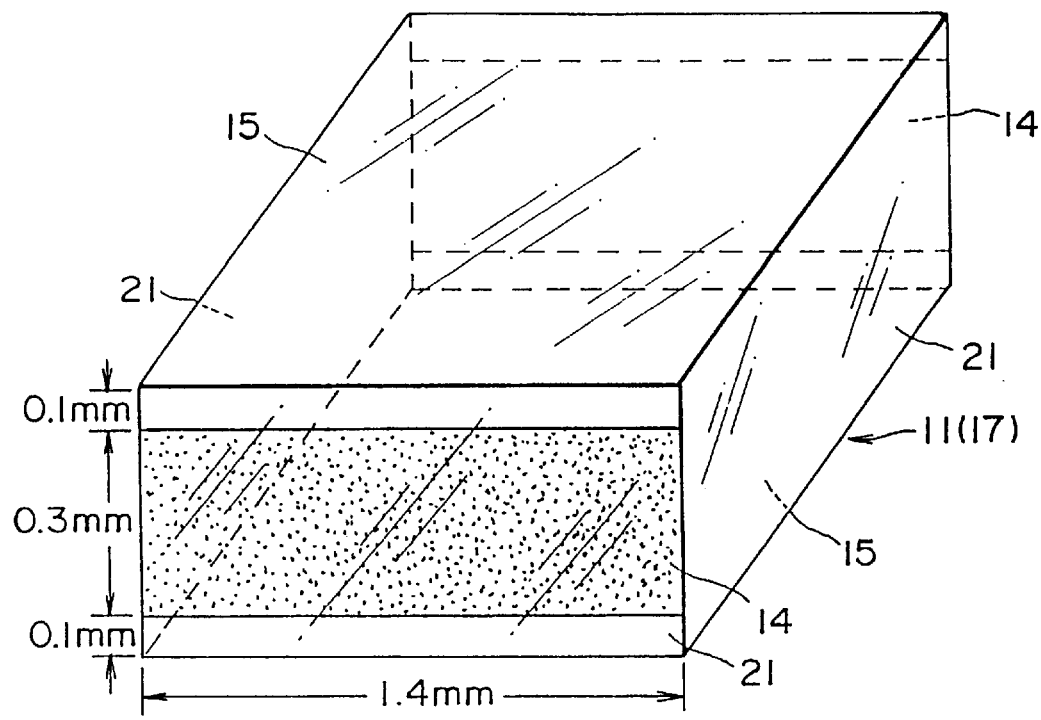
FIG. 2
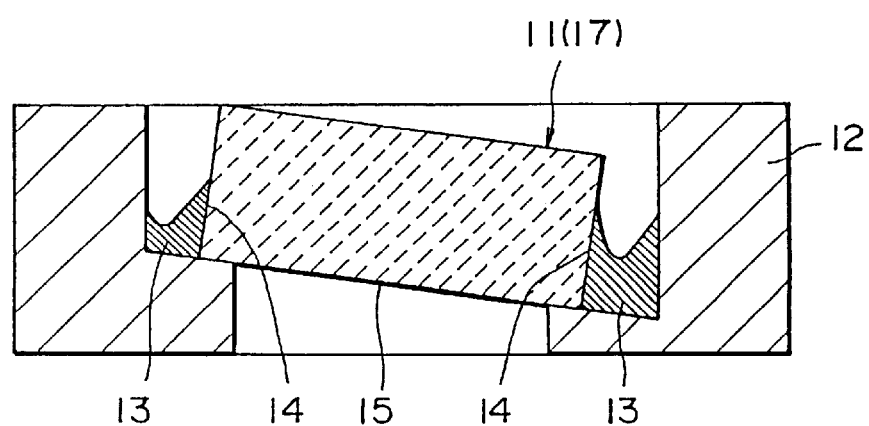

OPTICAL ISOLATOR AND OPTICAL PART HAVING HEAT-RESISTANT ANTI-REFLECTION COATING

This application is a divisional of Ser. No. 08/768,292, filed Dec. 17, 1996, now U.S. Pat. No. 5,872,652.

BACKGROUND OF THE INVENTION

The present invention relates to an optical isolator and an optical part having a heat-resistant anti-reflection coating. More particularly, the invention relates, in a first aspect of the invention, to an optical isolator provided with a polarizer and analyzer of polarizing glass to utilize the Faraday effect. In another aspect of the invention, the present invention relates to an optical part provided with a heat-resistant anti-reflection coating and suitable for use at an elevated temperature of 250° C. or higher.

An optical isolator is constructed from a polarizer and analyzer as well as a Faraday rotator and permanent magnet installed therebetween and these parts are built in a holder. While several particular modifications are known for an optical isolator, it is usual to use polarizing glass for the polarizer and analyzer in a compact optical isolator in view of the possibility of accomplishing a high quenching ratio and a small-thickness design. Several commercial products of polarizing glass are available on the market including Polacore (a product by Corning Glass Works Corp.).

Japanese Utility Model Kokai 5-96830 discloses a structure of an optical isolator, as is illustrated in FIG. 7 of the accompanying drawing, consisting of a polarizer 1, analyzer 7 and Faraday rotator 8 built in a tubular holder 6 and a tubular magnet 9 in which a holder ring 2 is used in order to facilitate exact position adjustment of the polarizer 1, analyzer 7 and Faraday rotator 8. A diaphragm 10 is provided to limit the light incident on the polarizer 1. It is a known method to use an adhesive of an organic polymeric resin for bonding and fixing the polarizer 1 and analyzer 7 to the respective holder rings 2 and the Faraday rotator 8 to the tubular magnet 9.

When the polarizer 1, analyzer 7 and Faraday rotator 8 are bonded to the holder rings 2 and to the tubular magnet 9 by using an adhesive, however, the adhesive has a relatively large thermal expansion coefficient so that a great displacement from the exact setting of the inclination angle is sometimes caused by the variations in the ambient temperature. This phenomenon unavoidably results in a deviation of the optical axis once optimized by adjustment due to the variation in the ambient temperature. In addition, volatile organic matters are emitted from the adhesive to cause contamination and degradation of the laser as the light source decreasing the long-term reliability of the optical isolator.

As a solution for the above mentioned problem of low long-term reliability of the optical isolator, it is known that the polarizer, analyzer and Faraday rotator are bonded and fixed to the respective holding parts by the use of a solder or brazing alloy or low melting-point glass. As the solder alloy for this purpose, gold-based solder alloys free from lead are used in recent years in consideration of the problem of environmental pollution due to heavy metals such as lead.

In bonding and fixing the polarizer, analyzer and Faraday rotator to the holding parts by soldering, one of the very important requirements is that the difference in the thermal expansion coefficients should be as small as possible between the holding parts and each of the polarizer, analyzer and Faraday rotator because, if the difference in the thermal expansion coefficients is great, cracks are possibly formed in the polarizer, analyzer and Faraday rotator due to the thermal stress resulting in complete loss of the performance of the optical isolator. This phenomenon is particularly remarkable in the bonding and fixing works between a holder ring and a polarizer and analyzer made from polarizing glass.

Following methods are known to solve the problem due to crack formation mentioned above.

(1) A method is disclosed in Japanese Patent Kokai 5-11215 in which the optical element and the holding part are bonded with intervention of a spacer having an intermediate thermal expansion coefficient. The material of the spacer is preferably a ceramic and the spacer has a configuration of a circular ring, optionally, provided with a slit or cutout, a configuration to match the metallized part for soldering in the optical element or a square configuration with a circular openwork at the center, optionally, divided into portions.

(2) Japanese Utility Model Kokai 6-4735 discloses a method in which the holding part is provided with a slit.

(3) Japanese Patent Kokai 6-167675 teaches forming the holding part from an alloy having a thermal expansion coefficient close to that of the polarizing glass such as Fe—32Ni alloy and Fe—42Ni alloy.

The inventors have tried to test the practicability of the above described first to third methods for bonding and fixing of a polarizer and analyzer of polarizing glass to a holder ring by soldering and found a problem that, though without formation of cracks, the quenching ratio is not sufficiently high in the polarizer and analyzer after bonding so that the optical isolator using the same cannot work at a high quenching ratio.

The reason therefor is, like the reason for the above mentioned crack formation, presumably the thermal stress due to the difference in the thermal expansion coefficients between the polarizer and/or the analyzer and the holder rings. Although cracks are not formed in the above mentioned first to third methods by virtue of the decrease in the thermal stress in the polarizer and analyzer, namely, relaxation of the thermal stress is still incomplete not to ensure a high quenching ratio as an optical isolator.

Following are further known methods for decreasing the thermal stress to accomplish a high quenching ratio of the polarizer and analyzer.

(4) Japanese Patent Kokai 6-34861 teaches a method in which the side surfaces of the optical element are metallized and the side surface of the optical element and the holding part are bonded with intervention of the metallized layer.

(5) Japanese Patent Kokai 6-67119 discloses a method in which the surfaces of the optical element, excepting the surfaces to serve for the light beam transmission, are provided with a metallized layer patterned in at least four concentrical rings with regular spaces between the adjacent rings, of which the overall metallized area is in the range from 5 to 25% based on the area for the incident light into the optical element.

The inventors have tried to test the practicability of the above described fourth and fifth methods for bonding and fixing of a polarizer and analyzer to holder rings by soldering and found a problem that the distribution of the quenching ratio is not uniform within the plane as is illustrated in FIG. 6 and the quenching ratio decreases from the center toward the bonded parts. This result leads to a consequence that optical isolators cannot be so compact as to be smaller than a certain limit and accordingly the costs thereof cannot be decreased as desired. The reason therefor is as follows.

It would be a possible way for obtaining an optical isolator of a high quenching ratio by using a polarizer and analyzer bonded to the holder rings by the above mentioned fourth or fifth method to use a polarizer and analyzer having a sufficiently larger surface area than the light-transmitting surfaces. Namely, the optical isolator can exhibit desirable performance by utilizing the portions of a high quenching ratio only fully isolated from the bonding parts. This method, however, has a problem that the compactness of the optical isolator has a lower limit and the optical isolator cannot be more compact than the limit. In view of the expensiveness of available commercial products of polarizing glass in general such as Polacore mentioned above, on the other hand, it is an important requirement that the area of the polarizer and analyzer should be as small as possible in order to minimize the costs of optical isolators. Accordingly, it is almost impossible by the conventional technology to have compatibility between these requirements for compactness and inexpensiveness of optical isolators with a high quenching ratio.

The above described attempts undertaken by the inventors have led to a conclusion that a quenching ratio sufficiently high for an optical isolator could hardly be accomplished by the first to third methods only teaching selection of the materials and configurations of the holder rings although the problem of crack formation could be solved thereby. Further, a compact and inexpensive optical isolator having a high quenching ratio can hardly be obtained by utilizing the above described first to fifth methods either singly or in combination because of the great non-uniformity in the distribution of the quenching ratio within the plane although the quenching ratio can be partially high enough.

While the overall stress by bonding can be reduced by decreasing the bonding area, the disclosure in Japanese Patent Kokai 6-67119 teaches that the bonding area cannot be decreased below a certain level in order to ensure a bonding strength suitable for practical use of the optical isolator. Thus, it is a conclusion that none of or no combinations of the above described first to fifth methods could satisfy all of the requirements for an optical isolator relative to a high quenching ratio, high bonding strength, compactness and inexpensiveness simultaneously.

Turning now to the second aspect of the invention, it is usual that various kinds of optical parts or elements such as optical glass bodies, single crystals, plastic-made optical parts and the like are provided with an anti-reflection coating film on the surface with an object to decrease reflection of light. Such an anti-reflection coating film is either a monolayered film or a multilayered film depending on the particular intended application of the optical part. When the anti-reflection coating film is a monolayered film, the film is formed from $TiO_2$, $Ta_2O_5$, $ZrO_2$ and the like to have a very small thickness while the coating film having a multilayered structure consists, in many cases, of the above mentioned thin film of a titanium oxide and the like which is overlaid with another thin film having a low refractive index such as $SiO_2$. These anti-reflection coating films are formed on the surface of the optical part by the method of vacuum vapor-phase deposition, ion plating, sputtering or the like.

The reflectivity of an anti-reflection coating film depends on the wavelength of the incident light, angle of incidence of the light, optical film thickness, i.e. the product of the refractive index and the thickness of the film, of each layer and structure of lamination of layers. When a high refractive index is desired, the anti-reflection coating film is formed from an oxide of titanium such as $TiO_2$ while titanium oxide used for forming the anti-reflection coating film on an optical part include TiO, $TiO_2$, $Ti_3O_5$ and the like or, in a general formula, $TiO_x$ of which the value of the subscript x largely depends on the method of film formation, conditions of film formation and types of the source material for film formation. As a method for the formation of a coating film of $TiO_x$, K. Narasimha Rao, et al. in Journal of Vacuum Science and Technology, A11, pages 394–397 (1993) teach a method of vapor-phase deposition in which a $TiO_2$ film is formed by the deposition of TiO onto the substrate surface at 250° C. while the substrate surface is under irradiation with oxygen ion beams. H. Demiryon, et al. in Journal of Vacuum Science and Technology, A2, pages 1457–1460 (1984) teach a method in which $TiO_2$ is deposited onto the substrate surface under irradiation of the substrate surface with ion beams of an argon-oxygen mixture.

On the other hand, it is sometimes the case that an optical part is bonded and fixed to another optical part or to a casing by using a metallic or inorganic bonding agent such as solder alloys and glassy materials of low melting point. When these bonding agents are used for such a purpose, needless to say, the bonding agent must be heated up to or above the melting point of the scolder alloy or softening point of the glass. When the solder alloy is a gold-tin alloy, for example, the heating temperature must usually be 280° C. or higher.

A problem caused by this heating for the bonding work of optical parts is that the anti-reflection coating film suffers a change in the optical film thickness. When an optical part provided with an anti-reflection coating of $TiO_2$ is bonded and fixed, with soldering under heating up to 280° C. or higher, for example, an increase is caused in the reflectivity of the anti-reflection coating film after bonding. Incidentally, the above mentioned literature by K. Narasimha Rao, et al. does not assume a case in which the heating temperature of a $TiO_2$ film in the bonding works exceeds 250° C.

SUMMARY OF THE INVENTION

The present invention accordingly has an object, in the first aspect of the invention, to provide an improvement in am optical isolator comprising a polarizer, an analyzer, a Faraday rotator, a holder to contain the polarizer, analyzer and Faraday rotator and holder rings for the position adjustment of the parts.

Another object of the invention is, in the second aspect of the invention, to provide an optical part of stable performance having a heat-resistant anti-reflection coating film without causing an increase in the reflectivity even when the optical part is heated for bonding to 250° C. or higher or used at such an elevated temperature.

Thus, the present invention, in the first aspect of the invention, provides an improvement, in an optical isolator comprising a polarizer, an analyzer, a Faraday rotator and a tubular permanent magnet built in a holder having holder rings for the position adjustment of the polarizer and analyzer, according to which improvement the optical isolator comprises a polarizer and an analyzer having side surfaces metallized on the areas excepting for the linear areas, of which the width is in the range from 50 µm to 150 µm or, preferably, from 80 to 120 µm from the top and bottom surfaces of the polarizer and analyzer, the polarizer and analyzer being bonded and fixed to the respective holder rings by soldering using a solder alloy, which is preferably a gold-tin alloy or gold-germanium alloy, with intervention of the metallized layer there-between.

Further, the present invention provides, in the second aspect of the invention, an optical part having a heat-resistant anti-reflection coating film which is a thin film formed from a titanium oxide having a chemical composition expressed by the formula $TiO_x$, in which the subscript x is a positive number in the range from 1.9 to 2.2, or a double-layered film consisting of a thin film of $TiO_x$ and a thin film of $SiO_2$.

BRIEF DESCRIPTION OF THE DRAWING

FIG. 1 is a perspective view of a polarizer or analyzer having metallized surfaces according to the invention.

FIG. 2 is an illustration of the construction with a polarizer or analyzer bonded to the holder ring by soldering by a cross sectional view.

DETAILED DESCRIPTION OF THE PREFERRED EMBODIMENTS

Figure 3:
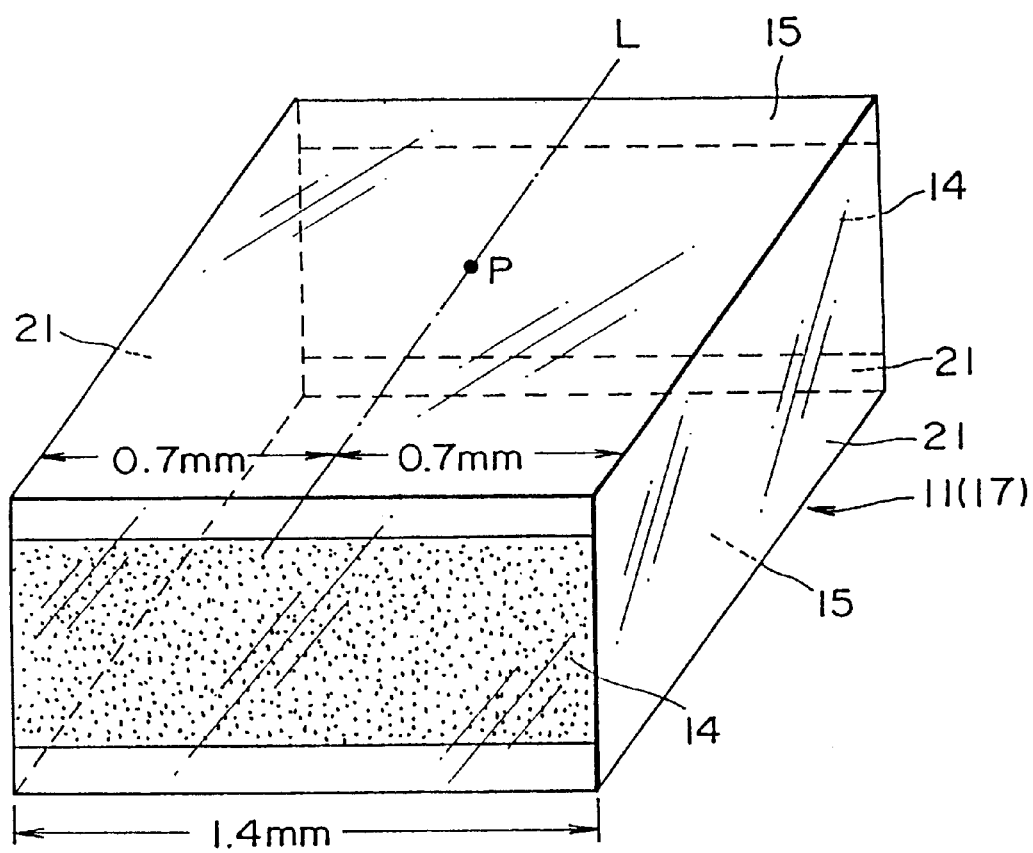
FIG. 3 is an illustration of the measuring position of the quenching ratio on the polarizer or analyzer shown in FIG. 1 by a perspective view.

As is described above, the present invention in the first aspect relates to an improvement in the bonding way of a polarizer and/or analyzer as the components of an optical isolator to the holder rings by soldering.

As a result of their extensive investigations, the inventors have arrived at an unexpected discovery that, when a polarizer and analyzer in an optical isolator are made from polarizing glass such as a commercial product of Polacore (supra), the polarizability of the polarizer and analyzer is a phenomenon ascribable only to the very thin surface layers thereof so that, if such a layer is free from concentration of stress, degradation in the quenching ratio never takes place. While, in the present invention, the surface area to be metallized is limited to the side surfaces excepting linear areas of 100 μm width from the top and bottom surfaces, this is because thickness of the surface layer of a polarizing glass body having an influence on the polarizability of the glass body cannot exceed 100 μm from the surface. Accordingly, it is essential that the areas on the side surfaces close to the top and bottom surface layers having polarizability are free from metallization. When this requirement is satisfied, a compact and low-cost optical isolator can be constructed with a high quenching ratio and very narrow distribution range of the quenching ratio within the plane.

FIG. 1 of the accompanying drawing is a perspective view of a polarizer 11 or analyzer 17 in the configuration of a, rectangular parallelepiped or rectangular plate having six surfaces 21, 21, 21, 21, 15, 15, of which at least two of the four side surfaces 21 are subjected to metallization and the grained areas 14 on the side surface 21 defined by excepting the upper and lower very narrow linear areas of each 100 μm width are the areas for actual metallization.

The material forming the polarizer and analyzer is preferably polarizing glass which is not particularly limitative provided that the surface thereof has polarizability as exemplified by the commercial product of Polacore (supra). The thickness of the polarizer 11 or analyzer 17 is preferably in the range from 0.3 mm to 0.6 mm. The polarizer 11 or analyzer 17 illustrated in FIG. 1 has a thickness of 0.5 mm.

It is necessary that at least two of the four side surfaces 21 of the polarizer 11 or analyzer 17 are metallized excepting the narrow linear zones of 100 μm width from the top and bottom, surfaces 15 and the metallized area 14 is preferably at least two thirds large of the overall area of the side surface 21. When the metallized area 14 is too small, the bonding strength cannot be high enough not to accomplish high reliability of the optical isolator.

As is mentioned above, it is necessary that metallization is effected on at least two of the four side surfaces 21 or, namely, on the two opposite surfaces 21 or on all of the four side surfaces 21 excepting the top and bottom surfaces 15. In FIG. 1, two metallized areas 14 are on the two opposite side surfaces 21. The overall area of metallization in the polarizer 11 or analyzer 17 illustrated in FIG. 1 is at least 0.56 mm$^2$ which is two thirds of maximum metallizable area on two opposite side surfaces 21, i.e. 1.4×0.3×2×⅔ mm$^2$, and cannot exceed 1.68 mm$^2$ which is the sum of the metallizable areas 14 on all of the four side surfaces 21, i.e. 1.4×0.3×4 mm$^2$. When the overall metallized area available for bonding is within the above mentioned range, failure in bonding in the optical isolator does not take place in an impact test and a high quenching ratio at the center and a lowest quenching ratio within the plane which is not too low can be obtained irrespective of the metallized area for bonding.

The method for the metallization is not particularly limitative and, for example, a three-layered structure consisting of chromium, platinum and gold having a thickness of 0.5 to 5 μm can be formed by the method of vacuum vapor-phase deposition, sputtering or chemical vapor-phase deposition.

FIG. 2 is a schematic illustration of a polarizer 11 or analyzer 17 bonded to a holder ring 12 by using a solder alloy 13 on the metallized areas 14 according to the invention by a cross sectional view.

The solder or brazing alloy used in bonding of the polarizer or analyzer to the respective holder rings is not particularly limitative including, preferably, a gold-tin alloy and gold-germanium alloy. These solder alloys are preferable in respects of little troubles due to crack formation, high bonding strength to withstand the impact test of the optical isolator and absence of any adverse influences on the quenching ratio at the center and the lowest quenching ratio within the plane to ensure high performance of the optical isolator if not to mention that these alloys are free from the problem of environmental pollution due to toxicity of heavy metals such as lead contained in the solder alloy.

The material of the holder ring is preferably a Kovar alloy or an iron-nickel alloy because these alloys have a thermal expansion coefficient close to that of the polarizing glass, e.g., 6.5×10$^{-6}$/K, not to cause troubles due to crack formation after bonding by soldering. The above mentioned Kovar alloy is an alloy consisting, for example, of 29% by weight of nickel, 17% by weight of cobalt and the balance of iron and having a thermal expansion coefficient of $4.7 \times 10^{-6}$/K. Examples of suitable iron-nickel alloy includes the Fe—32Ni alloy consisting of 68% by weight of iron and 32% by weight of nickel and having a thermal expansion coefficient of $6.5 \times 10^{-6}$/K and Fe—42Ni alloy consisting of 58% by weight of iron and 42% by weight of nickel and having a thermal expansion coefficient of $6.5 \times 10^{-6}$/K. Incidentally, a grade of stainless steel SUS 340 has a thermal expansion coefficient of $20 \times 10^{-6}$/K so that the stainless steel is less preferable as the material of the holder rings than the above mentioned Kovar alloy and iron-nickel alloys.

Figure 4:
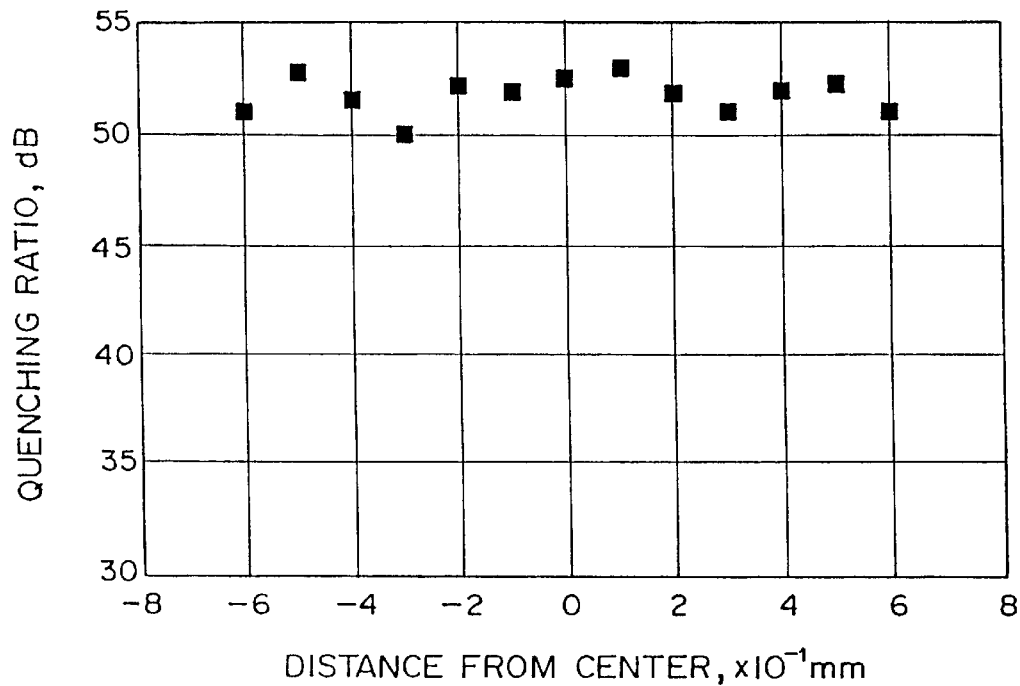
FIG. 4 is a diagram showing the quenching ratio of the polarizer or analyzer in the inventive optical isolator within plane.

FIG. 4 is a plot showing the distribution of the quenching ratio within the plane of the polarizer or analyzer prepared in Example 1 described below which indicates that the quenching ratio even at the measuring point in the proximity of the soldered areas is approximately equal to the sufficiently large value at the center suggesting that the polarizer and analyzer can be very compact. This means that an optical isolator which is so compact and inexpensive exhibits a so high quenching ratio hardly obtained in the prior art can be manufactured according to the present invention.

Figure 8:
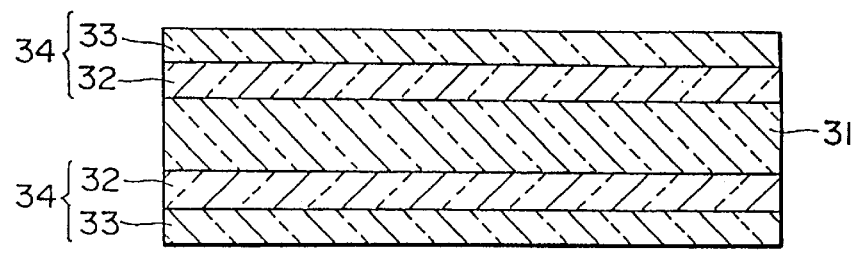
FIG. 8 illustrates an example of the optical part provided with a heat-resistant anti-reflection coating film according to the invention by a vertical cross sectional view.

Turning now to the optical part, such as an optical glass body, single crystal and optical plastic resin body, provided with a heat-resistant anti-reflection coating film on at least one of the surfaces according to the second aspect of the invention to withstand a heating temperature of 250° C. or higher, which is schematically illustrated in FIG. 8 by a cross sectional view, the anti-reflection coating film 34 on the surface of the optical part 31 is formed from a titanium oxide having a chemical composition expressed by the formula $TiO_x$, in which the subscript x is a positive number in the range from 1.9 to 2.2. The anti-reflection coating film 34 preferably has a two-layered structure consisting of a thin underlayer 32 of the titanium oxide and an overlayer 33 of silicon dioxide.

It is essential that the titanium oxide forming the heat-resistant anti-reflection coating film on an optical part has a chemical composition of $TiO_x$, in which x is 1.9 to 2.2, because, when the coating film has this chemical composition, the optical film thickness is free from variations even when the optical part is heated up to 250° C. or higher without affecting the reflectivity of the anti-reflection surface.

As is illustrated in FIG. 8, it is optional according to need that both surfaces of the optical part 31 are provided each with the heat-resistant anti-reflection coating film 34 consisting of the layer 32 of a high refractive index and layer 33 of a low refractive index. Such an optical part can be bonded to another optical part by using a solder alloy or bonding glass of low melting point, if necessary, under heating at a temperature of 250° C. or higher.

Figure 9:
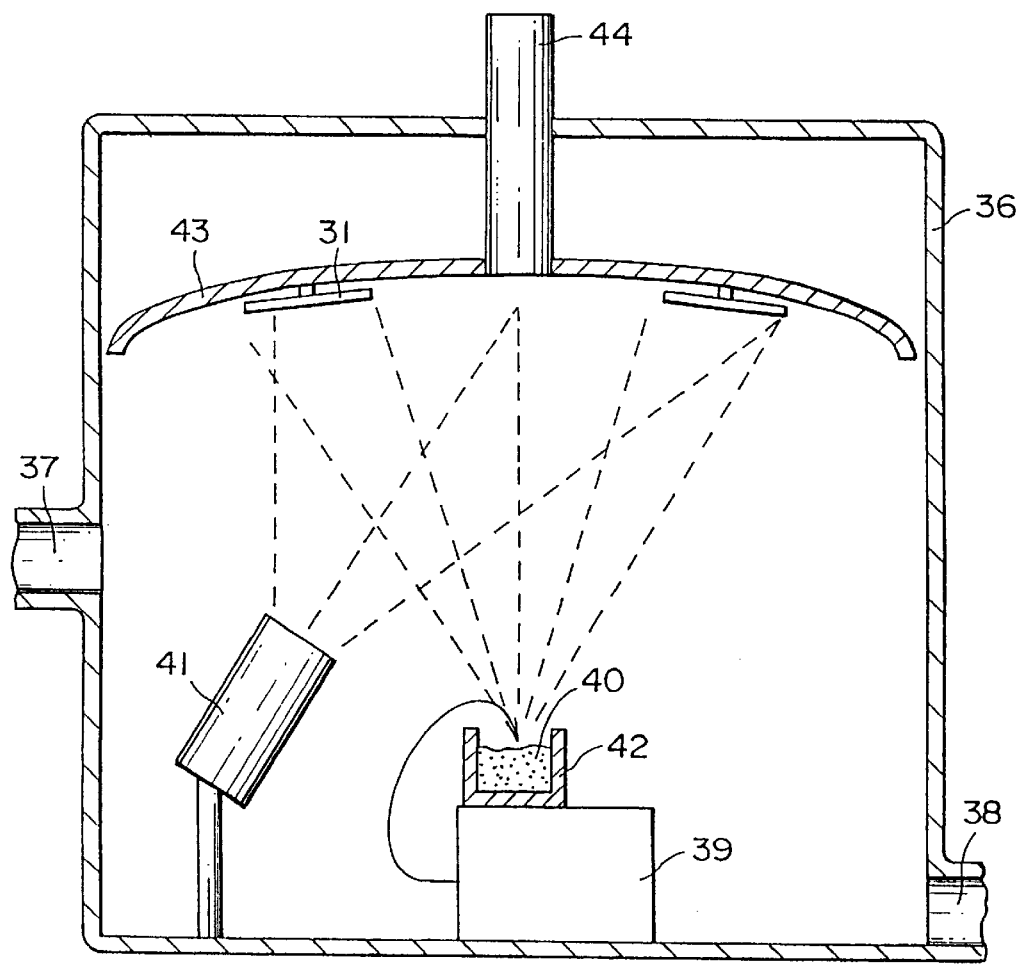
FIG. 9 is a schematic cross sectional view of a vacuum vapor-phase deposition chamber used for the formation of a heat-resistant anti-reflection coating film on an optical part.

FIG. 9 is a schematic cross sectional view of a vacuum vapor deposition chamber 36 for the formation of a heat-resistant anti-reflection coating film 34 on the surface of an optical part 31. The chamber 36 is provided with an oxygen-inlet port 37 and evacuation port 38 connected to an evacuation system (not shown in the figure) while these openings 37, 38 can be closed each by means of a valve (not shown in the figure) to vacuum-tightly seal the chamber 36. An electron gun 39 and an ion gun 41 are installed inside the chamber 36 and a crucible 42, in which the source material 40 to be vaporized for vapor-phase deposition is mounted on the electron gun 39. A holder 43 which holds the optical parts 31 to be coated is installed above the crucible 42 while the chamber 36 is equipped with an optical film thickness monitor 44.

In conducting the procedure of vacuum vapor-phase deposition, an optical part 31 for coating is set to the holder 43 and the chamber 36 is evacuated down to a preset pressure by means of the evacuation system through the evacuation port 38 followed by introduction of oxygen gas through the oxygen-inlet port 37. Thereafter, the source material 40 in the crucible 42 is heated by operating the electron gun 39 along with heating of the optical part 31 so that the source material 40 for a coating layer of high refractive index contained in the crucible 42 is vaporized and deposited on the surface of the optical part 31 to form a coating layer 32 of high refractive index. It is optional according to need that the ion gun 41 is operated to effect bombardment of the surface of the optical part 31 with oxygen ion beams. The thus obtained optical part 31 provided with a coating layer 32 of high refractive index is subjected to a second vacuum vapor-phase deposition procedure in substantially the same manner as above excepting for the replacement of the source material 40 for a coating layer 32 of high refractive index with another source material for a coating layer 33 of low refractive index such as silicon dioxide so as to complete a double-layered heat-resistant anti-reflection coating film 34.

In the following, some embodiments of the present invention are described by way of Examples.

EXAMPLE 1

A polarizer and an analyzer of optical glass were subjected to metallization to form a 3 μm thick metallized layer having a three-layered structure of chromium, platinum and gold in the following manner.

FIG. 1 illustrates a perspective view of a polarizer 11 or analyzer 17 provided with a metallized layer 14 shown by the grained area. The polarizer 11 or analyzer 17 was made from polarizing glass (Polacore, supra) and had dimensions of 1.4 mm by 1.4 mm by 0.5 mm. Two opposite side surfaces 21 were metallized each on the 1.4 mm by 0.30 mm wide area leaving the 0.10 mm wide narrow linear zones from the top and bottom surfaces 15, 15 as is shown in the figure so that the overall metallized area was 0.84 mm².

FIG. 2 schematically illustrates a cross sectional view of a construction consisting of the polarizer 11 or analyzer 17 of the polarizing glass Polacore and a holder ring 12 of a Kovar ally bonded together by using a gold-tin solder alloy 13 at a temperature of 300° C. in an electric furnace.

The thus prepared optical isolator was subjected to evaluation tests to find that it was free from cracks as inspected with an optical microscope and could withstand the impact test undertaken under the conditions of 2000 G and 0.3 msecond. Table 1 below summarizes the overall metallized area in mm², quenching ratio at the center point P and lowest quenching ratio within the plane which is the lowest value of the quenching ratios obtained by measuring the quenching ratio along the chain line L on the top surface of the polarizer 11 or analyzer 17 shown in FIG. 3.

EXAMPLE 2

The experimental procedure was substantially the same as in Example 1 except that the holder ring 12 was made from a Fe—32Ni alloy instead of the Kovar alloy. The optical isolator was free from cracks and could withstand the impact test. The results obtained by the measurement of the quenching ratio are shown in Table 1 below.

EXAMPLE 3

The experimental procedure was substantially the same as in Example 1 except that the holder ring 12 was made from a Fe—42Ni alloy instead of the Kovar alloy. The optical isolator was free from cracks and could withstand the impact test. The results obtained by the measurement of the quenching ratio are shown in Table 1 below.

EXAMPLE 4

The experimental procedure was substantially the same as in Example 1 except that the metallization was effected on the 1.4 mm by 0.2 mm areas leaving linear areas of 0.15 mm width from the top and bottom surfaces unmetallized. The optical isolator was free from cracks and could withstand the impact test. The results obtained by the measurement of the quenching ratio are shown in Table 1 below.

EXAMPLE 5

The experimental procedure was substantially the same as in Example 1 except that the metallization was effected on all of the four side surfaces each over a 1.4 mm by 0.3 mm area leaving 0.15 mm wide linear areas from the top and bottom surfaces unmetallized. The optical isolator was free from cracks and could withstand the impact test. The results obtained by the measurement of the quenching ratio are shown in Table 1 below.

EXAMPLE 6

The experimental procedure was substantially the same as in Example 1 except that the gold-tin solder alloy was replaced with a gold-germanium solder alloy and soldering was performed at 380° C. The optical isolator was free from cracks and could withstand the impact test. The results obtained by the measurement of the quenching ratio are shown in Table 1 below.

Comparative Example 1

Figure 5:
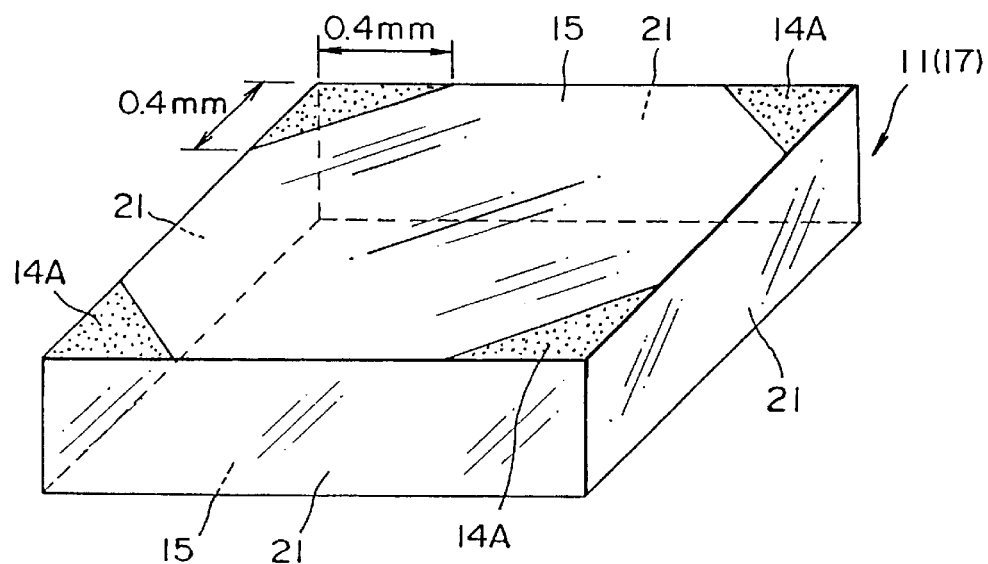
FIG. 5 is an illustration of the metallized surface areas on a polarizer or analyzer in Comparative Example 1.
Figure 6:
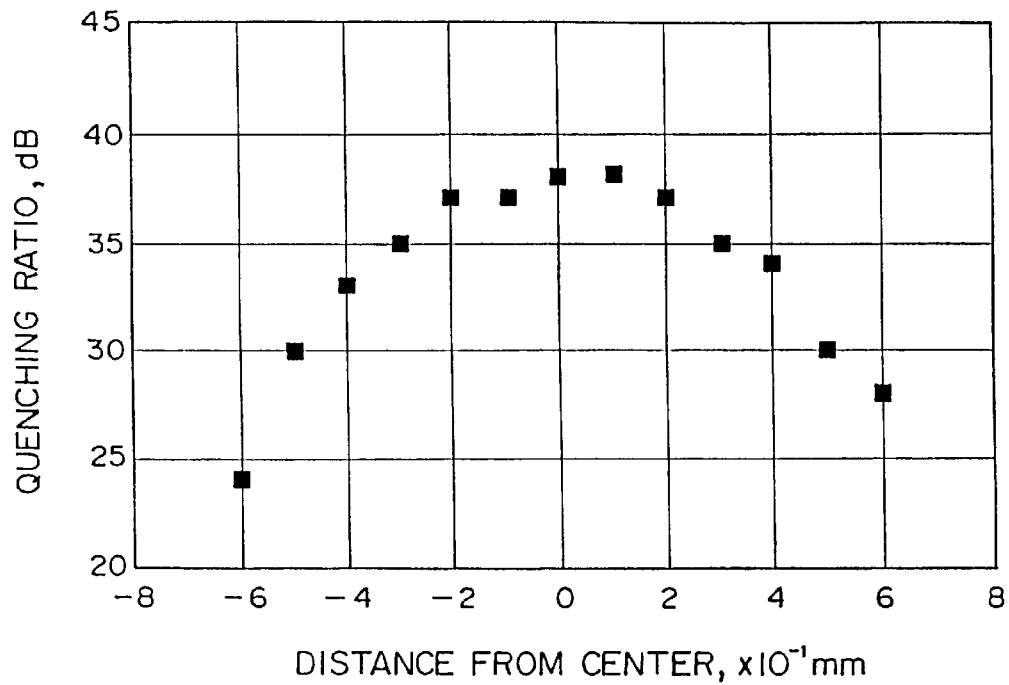
FIG. 6 is a diagram showing the quenching ratio of the polarizer or analyzer in a conventional optical isolator within plane.
Figure 7:
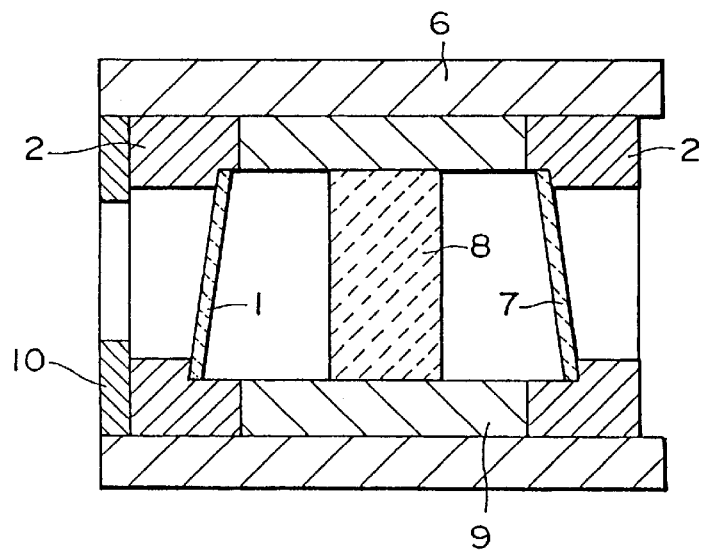
FIG. 7 is a schematic cross sectional view of an optical isolator showing the structure.

The experimental procedure was substantially the same as in Example 1 except that metallization was effected only on the four equilateral right-angled triangular corner areas 14A of the top surface 15 as is shown in FIG. 5 instead of the two rectangular areas 14 on the side surfaces. The optical isolator was free from cracks and could withstand the impact test. The results obtained by the measurement of the quenching ratio are shown in Table 1 below.

Comparative Example 2

The experimental procedure was substantially the same as in Example 1 except that metallization was effected allover the 1.4 mm by 0.5 mm wide areas of two opposite side surfaces 21 without leaving the 0.1 mm wide linear zones unmetallized. The optical isolator was free from cracks and could withstand the impact test. The results obtained by the measurement of the quenching ratio are shown in Table 1.

Comparative Example 3

The experimental procedure was substantially the same as in Example 1 except that the holder ring 12 was prepared from stainless steel SUS 304 instead of the Kovar alloy. The results of the evaluation tests of the optical isolator were that cracks were found in the polarizer and analyzer although the optical isolator could withstand the impact test. The results obtained by the measurement of the quenching ratio are shown in Table 1.

Comparative Example 4

The experimental procedure was substantially the same as in Example 1 except that metallization was effected over the 1.4 mm by 0.10 mm wide areas on the two opposite side surfaces 21, 21 leaving 0.20 mm wide linear zones from the top and bottom surfaces 15, 15 unmetallized. The results of the evaluation tests of the optical isolator were that, although no cracks were found in the polarizer and analyzer, the optical isolator could not withstand the impact test. The results obtained by the measurement of the quenching ratio are shown in Table 1.

TABLE 1

| | Metallized area, mm$^2$ | Quenching ratio, center, dB | Lowest quenching ratio within plane, dB |
|---|---|---|---|
| Example | | | |
| 1 | 0.84 | 52.4 | 50.0 |
| 2 | 0.84 | 51.5 | 50.9 |
| 3 | 0.84 | 51.9 | 49.2 |
| 4 | 0.56 | 51.9 | 50.2 |
| 5 | 1.68 | 52.1 | 49.9 |
| 6 | 0.84 | 51.4 | 50.3 |
| Comparative Example | | | |
| 1 | 0.32 | 38.0 | 24.0 |
| 2 | 1.40 | 43.2 | 32.3 |
| 3 | 0.84 | 34.2 | 21.8 |
| 4 | 0.28 | 51.8 | 50.1 |

FIG. 4 shows the distribution of the quenching ratio within the plane as measured in Example 1 along the center line L shown in FIG. 3 on the top surface 15 of the polarizer 11 or analyzer 17, from which it is understood that the quenching ratio is uniform allover the surface with a value at the solder-bonded portions approximately equal to the large value at the center point P. This result suggests that an optical isolator can be constructed with very compact polarizer and analyzer.

The results of Examples 1 and 6 indicate that the gold-tin alloy and gold-germanium alloy as the solder alloy are preferred in respect of absence of the troubles due to crack formation and the large quenching ratio of the optical isolator which can withstand the impact test by virtue of the good bonding strength therewith.

Comparison of the results obtained in Examples 1, 2 and 3 and those obtained in Comparative Example 3 is suggestive of the importance of a small difference in the thermal expansion coefficient between the polarizing glass of the polarizer or analyzer and the material of the holder ring, of which the thermal expansion coefficients were given before.

Further, comparison of the results obtained in Examples 1 and 4 and those obtained in Comparative Example 4 indicates that the optical isolator can withstand the impact test when the overall metallized surface area is 0.56 mm$^2$ or larger and the quenching ratio at the center and the lowest quenching ratio within the plane do not depend on the overall metallized surface area.

EXAMPLE 7

As a model of an optical part as the subject material in the second aspect of the invention, a fused silica glass plate 31 of 0.5 mm thickness having a refractive index of 1.44 for a wavelength of 1.31 μm was subjected to vacuum vapor-phase deposition for the formation of a double-layered heat-resistant anti-reflection coating film. Thus, the plate 31 was set in a vacuum vapor-phase deposition chamber 36 heated at a temperature of 300° C. and the chamber 6 was evacuated to have a pressure not higher than 1×10−5 Torr.

The source material 40 for vapor-phase deposition taken in the crucible 42 was titanium oxide of the formula $Ti_3O_5$. Thereafter, oxygen gas was introduced into the chamber 36 so as to increase the pressure inside to $2\times10^{-4}$ Torr and the electron gun 39 was operated to vaporize the titanium oxide 40 in the crucible 42 and the titanium oxide was deposited on both surfaces of the substrate plate 31 to form a coating film at a rate of film thickness growth of 0.3 nm per second under monitoring on the optical film thickness monitor 44 until the optical film thickness of the thus formed coating layer 32 of high refractive index reached 89 nm.

In the next place, another procedure of vacuum vapor-phase deposition was undertaken with interruption of introduction of oxygen gas for the formation of a 427 nm thick overcoating film of low refractive index 33 using granules of silica $SiO_2$ as the source material 40 instead of the titanium oxide under operation of the electron gun 39 at a growth rate of 0.5 nm per second. The double-layered heat-resistant anti-reflection coating film 34 thus formed on the fused silica glass substrate 31 was effective for the wavelength of 1.31 μm.

Separately, three fused silica glass plates 31 of each 0.5 mm thickness were subjected to the vacuum vapor-phase deposition of the coating film 32 of high refractive index of titanium oxide only in the same manner as above and the atomic ratio x of oxygen to titanium in the coating film was determined by the photoelectron spectroscopic method to find that the value of the subscript x in the formula $TiO_x$ was 1.9, 2.0 and 2.2 in the three specimens.

EXAMPLE 8

As a model of an optical part, a fused silica glass plate 31 of 0.5 mm thickness having a refractive index of 1.44 for a wavelength of 1.31 μm was subjected to vacuum vapor-phase deposition for the formation of a double-layered heat-resistant anti-reflection coating film 34. Thus, the plate 31 was set in a vacuum vapor-phase deposition chamber 36 heated at a temperature of 100° C. and the chamber 36 was evacuated to have a pressure not higher than $1\times10^{-5}$ Torr. The source material 40 for vacuum vapor-phase deposition taken in the crucible 42 was titanium dioxides of the formula $TiO_2$. Thereafter, oxygen gas was introduced into the chamber 36 so as to increase the pressure inside to $1\times10^{-4}$ Torr and the ion gun 41 was brought into so as to bombard the substrate plate 1 with oxygen ion beams at an ion energy of 750 eV in an ion-beam current density of 10 μA/cm² and the electron gun 39 was concurrently operated to vaporize the titanium oxide 40 in the crucible 42 and the titanium oxide was deposited on both surfaces of the substrate plate 31 to form a coating film 32 at a rate of film thickness growth of 0.3 nm per second under monitoring on the optical film thickness monitor 44 until the optical film thickness of the thus formed coating layer 32 of high refractive index reached 89 nm.

In the next place, another procedure of vacuum vapor-phase deposition was undertaken with interruption of introduction of oxygen gas for the formation of a 427 nm thick overcoating film of low refractive index 33 using granules of silica $SiO_2$ as the source material 40 instead of the titanium oxide under operation of the electron gun 39 at a growth rate of 0.5 nm per second. The double-layered heat-resistant anti-reflection coating film 34 thus formed on the fused silica glass substrate 31 was effective for the wavelength of 1.31 μm.

Separately, three fused silica glass plates 31 of each 0.5 mm thickness were subjected to the vacuum vapor-phase deposition of the coating film 32 of high refractive index of titanium oxide only in the same manner as above and the atomic ratio x of oxygen to titanium in the coating film 32 was determined by the photoelectron spectroscopic method to find that the value of the subscript x in the formula $TiO_x$ was 2.0, 2.1 and 2.1 in the three specimens.

Comparative Example 5

A heat-resistant anti-reflection coating film 34 for a wavelength of 1.31 μm was formed on each of the surfaces of a fused silica glass plate 31 in substantially the same manner as in Example 7 except that the source material of titanium oxide used in the formation of the coating film of high refractive index was $TiO_2$ instead of $Ti_3O_5$.

Separately, three fused silica glass plates 31 were subjected to the vacuum vapor-phase deposition of the coating film 32 of high refractive index of titanium oxide only in the same manner as above and the atomic ratio x of oxygen to titanium in the coating film 32 was determined by the photoelectron spectroscopic method to find that the value of the subscript x in the formula $TiO_x$ was 3.2, 2.3 and 2.8 in the three specimens.

Evaluation Tests

Each of the fused silica glass plates provided with the heat-resistant anti-reflection coating film as prepared in Examples 7 and 8 and Comparative Example 5 was subjected to the measurement of the transmissivity T in % for a laser beam of 1.31 μm wavelength under heating at a temperature in the range from 240° C. to 360° C. and the reflectivity R in % on the surface was calculated by the following equation:

$$T(\%) = 100 - 2R(\%).$$

Figure 10:
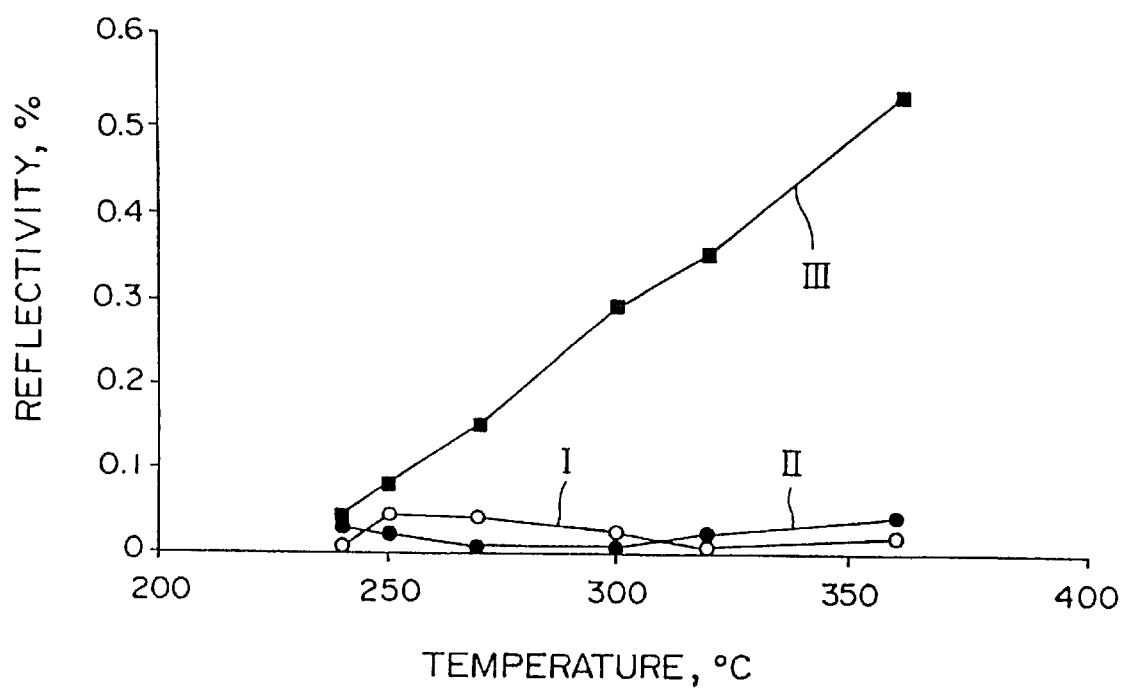
FIG. 10 is a graph showing the reflectivity of optical parts provided with an anti-reflection coating in Examples of the invention and in a Comparative Example as a function of the heating temperature.

The values of R obtained in the tests are shown in FIG. 10 as a function of temperature, in which the curves I, II and III are for Example 7, Example 8 and Comparative Example 5, respectively. As is understood from the graph, the reflectivity in Examples 7 and 2, in which the value of the subscript x in the formula $TiO_x$ not exceeding 2.2, was substantially independent on the temperature while the value of R in Comparative Example 5, in which the value of x was larger than 2.2, was increased approximately linearly as the temperature was increased above 240° C.

What is claimed is:

1. An optical part having, on at least one of the surfaces, a heat-resistant anti-reflection coating film comprising a thin film formed from a titanium oxide of the chemical composition expressed by the formula $TiO_x$, in which the subscript x is a positive number in the range from 2.1 to 2.2.

* * * * *